W. H. TOUCHETTE.
DOUBLE EXPOSURE PREVENTER FOR CAMERAS.
APPLICATION FILED APR. 18, 1919.
1,326,119.
Patented Dec. 23, 1919.
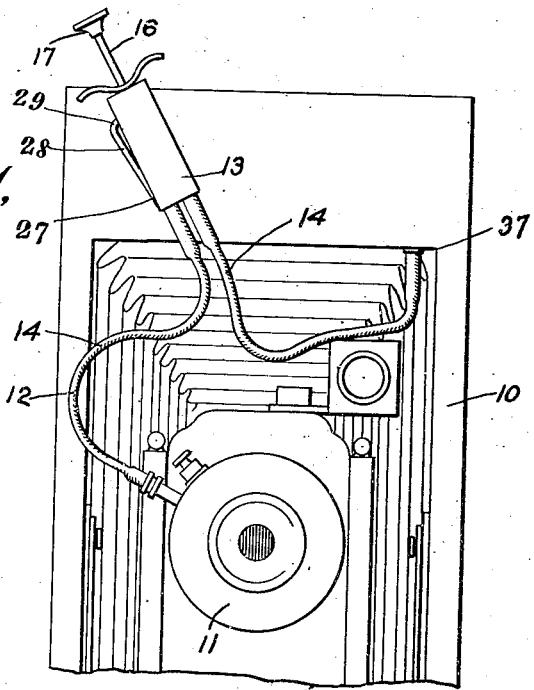
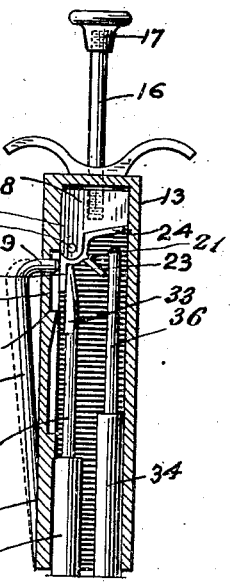
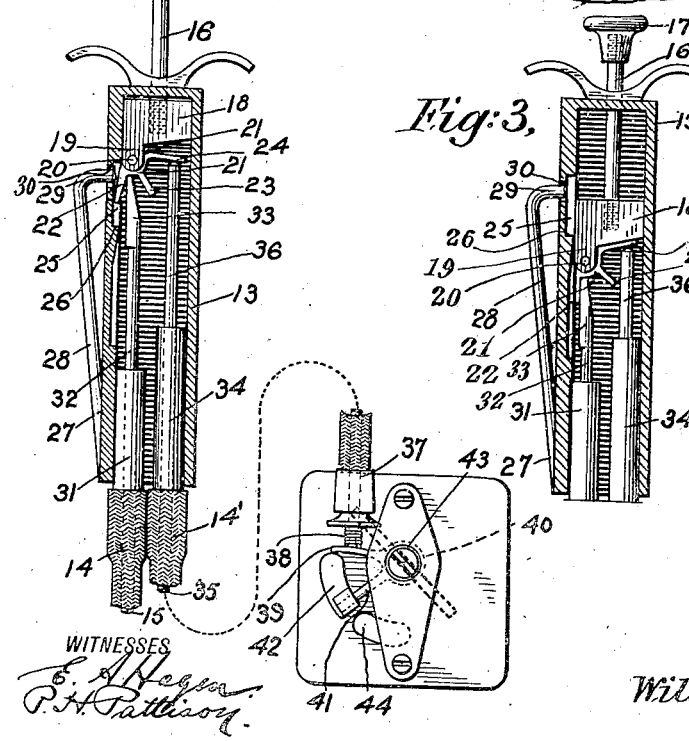
INVENTOR
William H. Touchette,
BY
ATTORNEYS

UNITED STATES PATENT OFFICE.

WILLIAM HOWARD TOUCHETTE, OF BURLINGTON, VERMONT, ASSIGNOR OF ONE-HALF TO FOSTER R. CLEMENT, OF BURLINGTON, VERMONT.

DOUBLE-EXPOSURE PREVENTER FOR CAMERAS.

1,326,119.  Specification of Letters Patent.  Patented Dec. 23, 1919.

Application filed April 18, 1919. Serial No. 290,957.

*To all whom it may concern:*

Be it known that I, WILLIAM H. TOUCHETTE, a citizen of the United States, and a resident of Burlington, in the county of Chittenden and State of Vermont, have invented a new and Improved Double-Exposure Preventer for Cameras, of which the following is a full, clear, and exact description.

The present invention relates to new and useful improvements in cameras, and pertains more particularly to an attachment to the shutter-actuating mechanism thereof.

It is the primary object of the present invention to provide means whereby accidental double exposure of a film or plate is prevented.

It is a further object of the present invention to provide means for preventing successive operations of the shutter-actuating mechanism until the film spool has been operated to properly position an unexposed film, or until the manually operated device herein referred to is released.

It is a further object of the present invention to provide means by which a second operation of the shutter-actuating mechanism is prevented when taking so-called "snap shots," and, at the same time, provide means for releasing the shutter mechanism to permit of the taking of "time exposures."

With the above and other objects in view, reference is had to the accompanying drawings in which Figure 1 is a front elevation of a camera showing the present invention attached thereto;

Fig. 2 is a longitudinal sectional view showing one of the steps in the operation of the device;

Fig. 3 is a similar view showing another step in the operation of the device;

Fig. 4 is a similar view showing the several parts in their normal position.

Referring more particularly to the drawings, the reference character 10 designates a camera, and 11 designates the shutter thereof. The reference character 12 designates the flexible connection between the shutter-operating mechanism and the housing 13. This connection 12 between the shutter-operating mechanism and the housing is of the type commonly employed in devices of this character and consists of a woven fabric tube 14, through which is passed a flexible wire 15, and said wire is surrounded by a spring as in the ordinary manner.

Mounted in one end of the housing 13, is a stem 16, and carried on the outer end thereof is an operating button 17. Secured in any desired manner to the inner end of the stem 16, is a plunger 18, and said plunger is provided at its forward end with projecting ears 19. Pivotally secured in the projecting ears 19, as at 20, is a pawl 21, and said pawl is provided with a plurality of spaced fingers 22, 23 and 24. One wall of the housing 13 is cut out to provide a recess 25, which terminates in a wall 26, and rigidly secured, as at 27, to the outer wall of the housing, is a resilient lever 28, and said lever has a right-angular end 29, which projects through an opening 30, into the recess 25.

Rigidly secured in one end of the housing 13, is a tubular member 31, and said tubular member 31 has one of its ends projecting beyond the end of the housing. The woven fabric 14' has its end connected to the projecting end of the tubular member 13, and the flexible wire 15, which passes through said woven fabric tube 14, passes through the tubular member 31, as at 32, and has its free end lying within the housing 13. The free extremity of the extension 32 of the flexible wire 15, is provided with an enlarged head 33, and said head 33 is adapted to lie between the fingers 22 and 23 of the pawl 21.

Mounted in the end of the housing 13, adjacent the tubular member 31, is a tubular member 34, which likewise has its end projecting beyond the end of said housing, and secured to the projecting end, is a woven fabric tube 14, similar to the one heretofore mentioned. Passing through the tubular member 34 and the woven fabric tube 14, is a flexible wire 35 moving freely in the tubular member 34, one end of which wire is projected beyond the end of the tubular member 34, as at 36, and is adapted for engagement with the finger 24 of the pawl 21. The opposite end of the flexible wire member 35 is led into the camera box, as at 37, and is engaged within a coil spring 38, which latter is connected to the arm 39 of a pawl 40. This pawl 40 has an arm 41, which carries a suitable signaling device 42, and said pawl 40 is mounted for movement about the axis 43 of the winding spool of the film mechanism by a frictional engagement.

The specific construction of the last mentioned portion of the device forms no part of the present invention, but is the subject-matter of a separate application, Serial No. 252,892, filed by me September 6, 1918.

Having thus described the invention, the operation thereof is as follows: Assuming that an unexposed film has been positioned within the camera, and the several parts of the device are in the position shown in Fig. 2, to make an exposure on the film, the operating button 17 is depressed and the plunger 18 is moved longitudinally of the housing 13. This movement of the plunger 18 causes a movement of the flexible wire 15, through the medium of its extension 32 engaging the pivoted pawl 21. Simultaneously with this operation, the finger 24 of the pawl 21 engages the extension 36 of the flexible wire 35, as shown in Fig. 2. With the parts in this position, if the operating button 17 be further depressed, it will be apparent that owing to the engagement of the extension 36 of the flexible wire 35 with the finger 24 of the pawl 21, the finger 22 of said pawl will be rocked out of the recess 25 and will be free to pass the projecting wall 26. Upon further depression of the operating button 17, the shutter-actuating mechanism is operated to make the exposure, and through the medium of the flexible wire 35, the signal 42 is moved in front of the sight opening 44. The positions of the several parts with the button 17 depressed, are shown in Fig. 3, and when pressure is relieved from the button 17, the resilient construction of the flexible wire 15 serves to return the same to the position shown in Fig. 2, while the extension 36 of the wire 35 remains in the position shown in Fig. 3, due to the fact that said wire 35 is not provided with resilient means for returning the same to the position shown in Fig. 2.

If, now, the button 17 be again depressed, it will be seen that the finger 22 of the pawl 21 will engage the wall 26 of the recess 25 and prevent movement of the plunger 18 longitudinally of the housing 13, to again operate the shutter mechanism and, therefore, the possibility of making a double exposure on the film is eliminated.

If the film roll be turned to position an unexposed film behind the shutter, the arm 39 of the pawl 40 forces the flexible wire 35 back to the position shown in Fig. 2 where its other end engages the finger 23 of the pawl 21.

If the button 17 be depressed, it will be seen that the above-described operation will be repeated.

In the taking of time exposures, it is necessary that the shutter mechanism be given two clear and distinct operations, one for opening the shutter and the other for closing the shutter, and to permit of these two operations, the resilient lever 28 is provided.

Assuming that the button 17 has been depressed in the above-described manner, and the several parts are in the position shown in Fig. 3, with the shutter open, the removal of pressure on the button 17, permits the parts to return to the position shown in Fig. 2, with the extension 36 of the wire 35 occupying the position shown in Fig. 3. With the parts in this position, it will be seen that if the operating button 17 is depressed, the finger 22 of the pawl 21 will engage the wall 26 of the recess 25, and prevent movement of the plunger 18 longitudinally of the housing 13 to operate the shutter to close the same. If, now, however, the resilient lever 28 be depressed, as shown in full lines in Fig. 3, it will be seen that the finger 22 of the pawl 21 will be rocked out of engagement with the wall 26 of the recess 25, and the plunger 18 will then be free to move longitudinally of the housing 13 to permit of closing the shutter.

From the foregoing, it will be apparent that the present invention not only provides means whereby the double exposure of a film is prevented, but, at the same time, permits of a double operation of the shutter mechanism for the purpose of taking time exposures.

Having thus described the invention, what is claimed as new is—

1. A device of the character described comprising a housing provided in one of its walls with a shoulder, a shutter-releasing mechanism carried by said housing, means carried by said shutter-releasing mechanism for engagement with the shoulder of housing to prevent movement of the shutter-releasing mechanism, and manually operated means for releasing said shutter-releasing mechanism.

2. In combination with a camera, its shutter-actuating mechanism, and its film mechanism, a housing provided on its interior with a projecting wall, a plunger movable longitudinally of said housing to operate the shutter actuating mechanism, a pawl pivotally carried by said plunger and adapted to engage the projecting wall in said housing to prevent movement of the plunger longitudinally thereof, means operated by the film mechanism for disengaging said pawl from the projecting wall, and means independent of the means operated by the film mechanism for disengaging said pawl from the wall of the housing.

3. In combination with a camera, its shutter-actuating mechanism, and its film-winding mechanism, a housing provided on its interior with a projecting wall, a plunger movable longitudinally of said housing to operate a pawl carried by the plunger and adapted for engagement with the projecting wall of the housing to prevent movement of the plunger therein, means movable longitudinally of the housing and operated by the film winding mechanism for disengaging said pawl from said projecting wall, and separate means for disengaging said pawl from said projecting wall, said separate means comprising a resilient lever carried by said housing.

WILLIAM HOWARD TOUCHETTE.